(12) United States Patent
Rider

(10) Patent No.: US 7,342,878 B2
(45) Date of Patent: Mar. 11, 2008

(54) INPUT PORT ROUTING CIRCUIT THAT PERFORMS OUTPUT PORT FILTERING

(75) Inventor: Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 10/328,087

(22) Filed: Dec. 23, 2002

(65) Prior Publication Data

US 2004/0120254 A1 Jun. 24, 2004

(51) Int. Cl.
*G01R 31/08* (2006.01)
*H04L 12/28* (2006.01)
*H04J 3/16* (2006.01)

(52) U.S. Cl. .................. 370/230; 370/389; 370/465
(58) Field of Classification Search .............. None
See application file for complete search history.

(56) References Cited

U.S. PATENT DOCUMENTS

| | | | |
|---|---|---|---|
| 4,760,570 A | 7/1988 | Acampora et al. ............ 370/60 |
| 5,197,064 A | 3/1993 | Chao ............................ 370/60 |
| 5,473,598 A | 12/1995 | Takatori et al. ............... 370/16 |
| 5,764,641 A | 6/1998 | Lin ............................ 370/412 |
| 5,909,686 A | 6/1999 | Muller et al. ............... 707/104 |
| 6,212,184 B1 | 4/2001 | Venkatachary et al. ...... 370/392 |
| 6,216,167 B1 | 4/2001 | Momirov .................... 709/238 |
| 6,252,880 B1 | 6/2001 | Hanna et al. ............... 370/425 |
| 6,763,394 B2 * | 7/2004 | Tuck et al. ................. 709/238 |
| 6,898,752 B2 * | 5/2005 | Tucker ........................ 714/752 |
| 6,967,924 B1 * | 11/2005 | Aimoto ...................... 370/235 |
| 7,107,352 B2 * | 9/2006 | Tuck et al. ................. 709/238 |
| 2003/0031183 A1 * | 2/2003 | Kashyap et al. ......... 370/395.2 |
| 2004/0024903 A1 * | 2/2004 | Costatino et al. ........... 709/238 |
| 2004/0062242 A1 * | 4/2004 | Wadia et al. ............... 370/390 |

* cited by examiner

*Primary Examiner*—Chau Nguyen
*Assistant Examiner*—Nittaya Juntima
(74) *Attorney, Agent, or Firm*—Joseph Biela, Esq.; Lawrence D. Cutter, Esq.; Heslin Rothenberg Farley & Mesiti P.C.

(57) ABSTRACT

The filtering operations normally performed at the output port side of an Infiniband (or similar protocol) routing switch are performed in parallel at the input side to prevent data packets from being placed on a queue from which they would ordinarily ultimately be discarded, thus removing "bad" packets that would normally have a negative impact on the bandwidth of the switch. Bad data packets thus do not consume space in a central queue nor bandwidth in a crossbar switch.

2 Claims, 2 Drawing Sheets

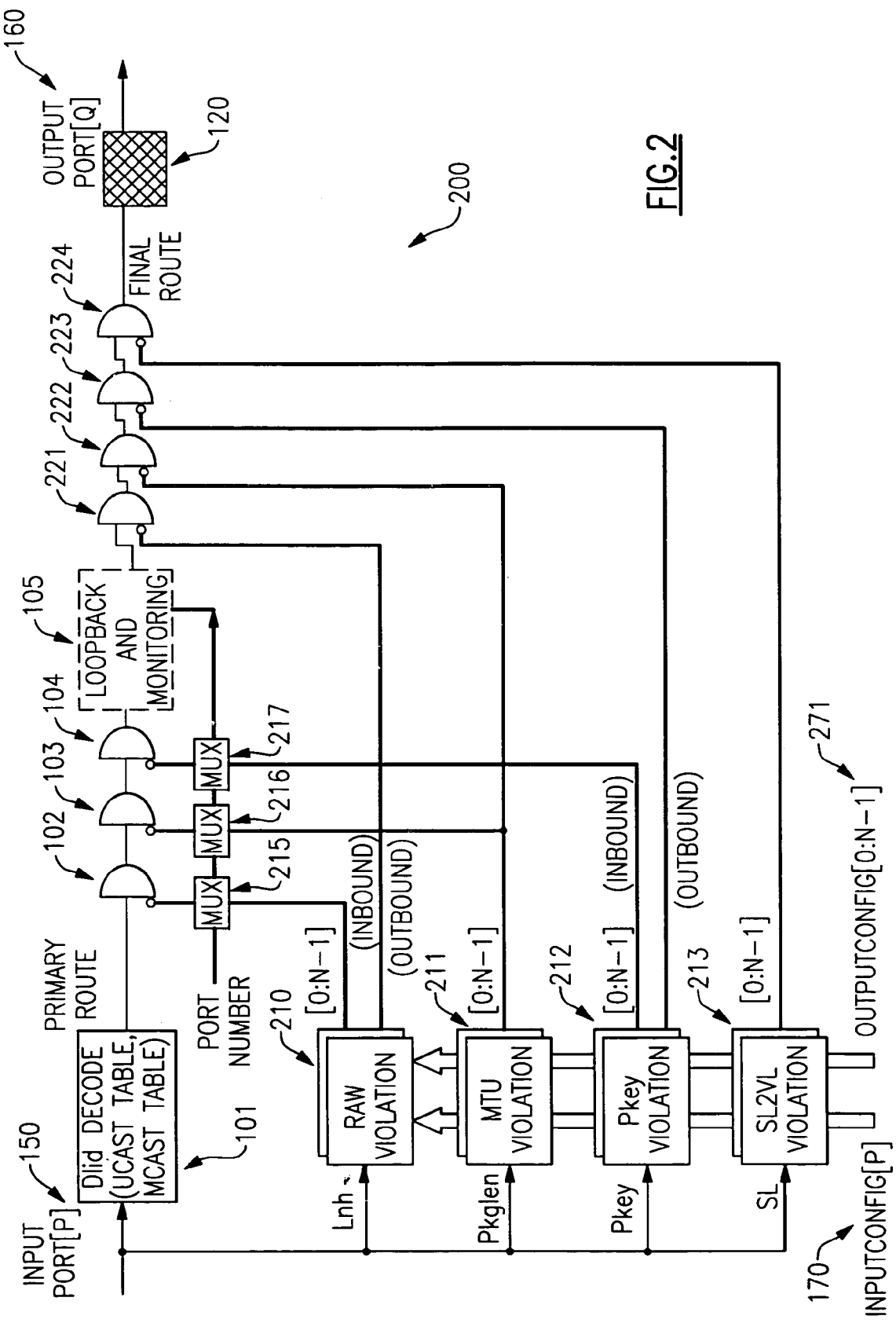

INPUT PORT ROUTING CIRCUIT THAT PERFORMS OUTPUT PORT FILTERING

BACKGROUND OF THE INVENTION

The present invention is directed to a method and circuit for the controlling the flow of information packets in a communications network. More particularly, the present invention is directed to a circuit and method for use with the Infiniband Networking (and storage) standard in which information packets arriving at an input port are discarded prior to being placed in a queue for transfer to an output port. This filtering is carried out through use of information contained at least partially within the data packet or information packet (herein after, "packet") header.

This invention is a routing circuit for an Infiniband switch that is capable of determining the output port filtering conditions before actually routing the packet to the output port. The primary advantage of this filtering operation is found within Infiniband switches that have a centralized queue; however, advantages are also obtained using crossbar switches as well. By filtering out packets that contain output port violations before they are put into the queue, any packet actually pulled out of the central queue by the output port is guaranteed to be good and is transmittable (with regard to the filters contained within this invention). This improves overall transmission performance by reducing the load on the output ports, since space is not wasted in the central queue by packets that would have eventually been discarded.

Current solutions to this problem involve filtering operations performed at the output ports after the packet has been pulled by the port from either a centralized queue or from a cross-bar switch. In either case, if an error is seen, the output port discards the packet instead of performing the actual task of packet transfer. In prior circuits for performing Infiniband transmission and routing, separate circuits are provided in the input and output ports for filtering. If a packet gets through the input filter checks, it is routed to the output port where the checks are repeated. If the packet is subsequently found to be invalid, it is discarded. However, the discarding process consumes output port bandwidth that otherwise could be used for data transmission.

SUMMARY OF THE INVENTION

In accordance with one embodiment of the present invention a method for information packet transmission comprises the steps of determining, at an input port, the presence of an output port packet transmission protocol violation from packet header information and preventing transmission of the packet to a queue of packets intended for transmission through at least one output port.

Accordingly, it is an object of the present invention to make the transfer of information packets more efficient.

It is also an object of the present invention to reduce the size of the queue of information packets existing between an input port and an output port.

It is a further object of the present invention to reduce workload requirements for the output port.

It is a still further object of the present invention to reduce the transfer of erroneous or useless packets of information into the output matrix for packet transfer.

It is an additional object of the present invention to filter out information packets whose header information, together with system configuration parameters, particularly those relating to the output port, indicates a transmission violation.

It is also an object of the present invention to provide the capability for adjusting the parameters used to control information packet rejection.

It is yet another object of the present invention to improve the usage, efficiency and acceptability of the Infiniband network protocol, though not being limited thereto.

It is a further object of the present invention to provide input port filtering of data packets simultaneously for a plurality of input and output ports.

It is an additional object of the present invention to provide a packet filtering function in parallel with packet routing.

It is yet another object of the present invention to reduce the contention between tables and configuration information present on the input and output sides of a data packet transmission circuit.

It is also an object of the present invention to increase the number of cycles spent by an output port in transferring "good" data packets.

Lastly, but not limited hereto, it is an object of the present invention to carry out at least some of the objects above without impacting the packet rejection rate that would have otherwise been present.

The recitation herein of a list of desirable objects which are met by various embodiments of the present invention is not meant to imply or suggest that any or all of these objects are present as essential features, either individually or collectively, in the most general embodiment of the present invention or even in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 is a view similar to FIG. 1 but more particularly illustrating the circuit improvements of the present invention especially with respect to early filtering.

DETAILED DESCRIPTION OF THE INVENTION

Figure 1:
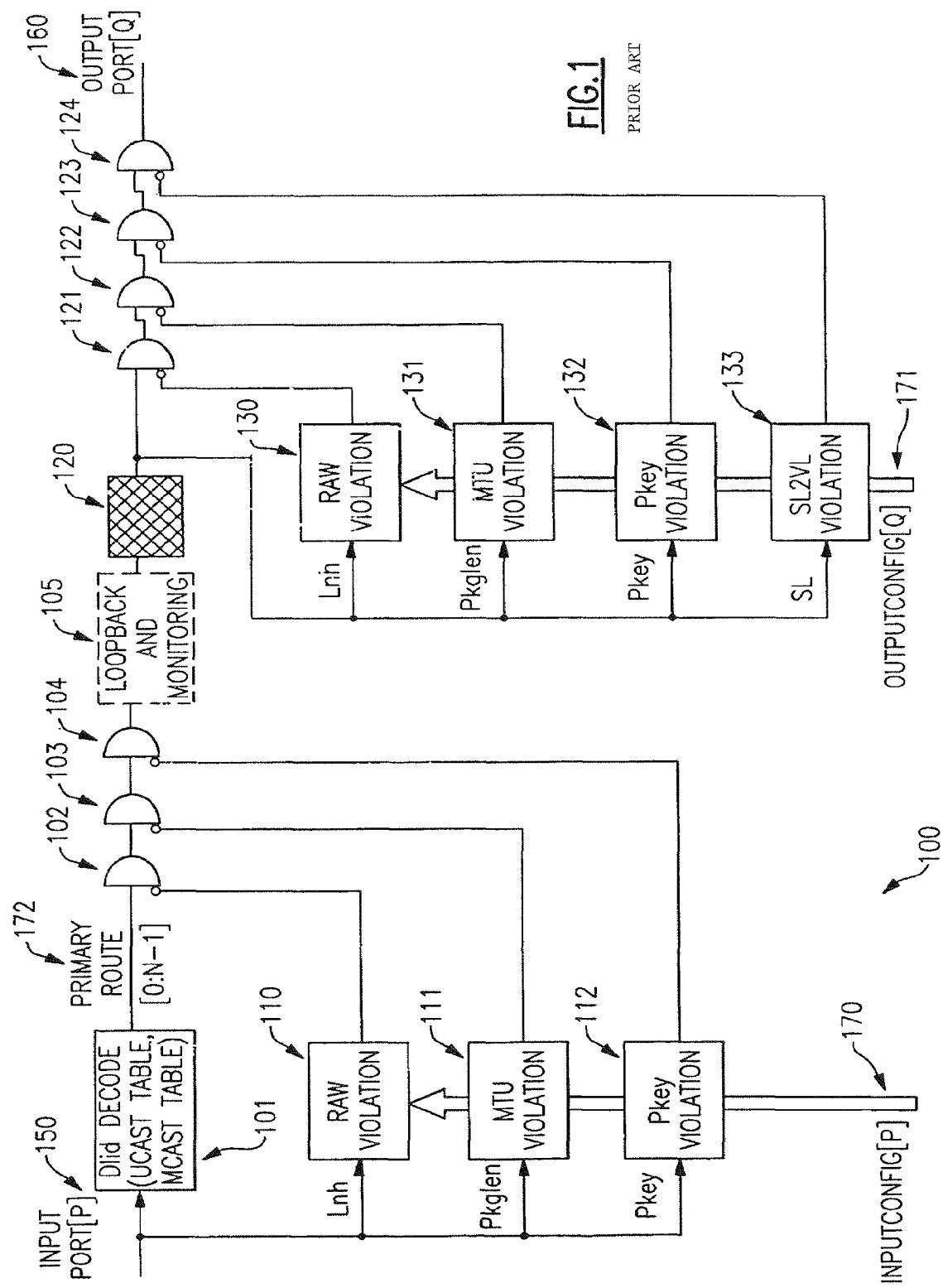
FIG. 1 is a partially schematic and partially block diagram illustrating the structures present between the input port and output port in the Infiniband protocol.

FIG. 1 illustrates the typical structure found in Infiniband transmission circuit 100 in which data packets with descriptive headers are received at Input Port 150 for ultimate transmission out of a particular Output Port 160. It is noted that FIG. 1 is a highly schematic representation of the passage of a data packet via the Infiniband protocol. However, it does accurately represent the operations carried out in passage from an input port to an output port to which the packet is routed for transmission.

Infiniband packets include a packet header with a DLID field (Destination Local Identifier). The information in the DLID field is decoded in functional block 101 and provides a reference to a Ucast Table (unicast) and an Mcast Table (multicast). The Unicast table contains a cross reference between a list of unicast Dlids and the route intended for that dlid. The Mcast Table contains a cross reference between a multicast Dlid and the routes intended for that dlid. The header also contains information that is used to determine if the packet is qualified for transmission to Output Port 160. Data packets in the Infiniband protocol include information in the header to enable switches to detect the following architected Infiniband violations relevant to this invention: (1) Raw Packet Violations; (2) MTU Violations; (3) Pkey Violations; and (4) SL2VL Translation Violations. These are described subsequently.

A Raw Packet Violation occurs when the LNH field of the header indicates that a packet is "raw," as per the Infiniband standard, and the port is configured to discard raw packets. A Raw packet violation can further be classified as an Inbound Raw Packet Violation or an Outbound Raw Packet Violation based on whether the switch should be allowed to receive or transmit the packet on a particular port, respectfully.

An MTU (Maximum Transmission Unit) Violation occurs when the switch detects that the PKGLEN field of the packet exceeds the programmed MTU of the port, per the Infiniband standard.

A Pkey (Partition Key) Violation occurs when the switch detects (and is configured to detect) that the PKEY field of the header indicates that the packet does not belong to the partition it is accessing, as per the Infiniband standard. A Pkey Violation can further be classified and configured as an Inbound Pkey Violation, indicating it is not allowed to receive the packet on that port, or a Outbound Pkey Violation, indicating it is not allowed to transmit the packet to that port.

A SL2VL (Service Level to Virtual Lane) Violation occurs when the switch detects that the lookup of the SL field in the header resulted in an illegal Service Level to Virtual Lane Translation, as per the Infiniband standard.

The operation of these Violation filters in the common practice of the art is illustrated in FIG. 1. When a Packet arrives on Input Port[P] (150), (where P represents a port number or designation), the Raw Violation, MTU Violation, and Pkey Violation Checkers (110, 111, and 112 respectfully) determine whether there is a violation and if the violation is configured (170) and then use gates 102, 103, and 104 to remove that port designation from the route that was resolved by the Dlid decoder (101). The route is represented as a binary vector where the bit position indicates a valid route (i.e., 1010000 . . . 0 indicates port 0 and 2 are where the packet is destined). If any routes remain after these inbound filters (110, 111,112) are applied, the packet is sent into the switching matrix (120) (i.e., central queue or cross-bar switch) where the process is repeated via the corresponding outbound filters (130,131,132,133). If any route still remains at a particular output port (160), the packet is transmitted out of the switch. Note that in the common practice of the art, a packet can be retrieved out of the switching matrix (120) that will ultimately not be transmitted out of the switch. This is where the fundamental improvement of the current invention is seen.

In this invention the aforementioned filtering is all done in the input port by incorporating the routing operation with the filtering operation. That is, the input port will take into consideration what port the packet arrived at as well as where the packet is routed to, and will perform all the output port filtering operations in parallel, thus preventing any packet that will ultimately get filtered out in the transmitter from ever being put into the switching matrix. This has the following advantages:

1. Improved Utilization of bandwidth through the switching matrix

2. Reduced storage requirement of switching matrix.

3. Reduction of workload on the Output ports. Bad packets are filtered out at the rate of reception, not as an additional obligation of the Output port.

4. Improved performance of the Output port. Since it does not have to remove filter violations from the switching matrix, it only moves packets that have already been checked.

5. Simplification of the Output port. It does not do the filtering operation.

6. Reduced contention. The Pkey Violation check are typically done using a shared memory device. By doing the check in one place, there is no contention between the input port logic and output port logic.

These improvements are the embodiment of the invention and are illustrated in FIG. 2. Here the aforementioned Violations checkers (210,211,212,213) are present only in the input port side and duplicated (1 for each port) since the filtering operation is done in parallel. The outputs of the filters are binary vectors indicating which port has a violation (i.e., 01010000 . . . 0 indicates ports 1 and 3 have a violation). In the case of the input port, the violation specific to that input port is selected via the multiplexors (215, 216, 217). However, in the case of the output ports, parallel instantiations of gates (221,222,223,224) will remove from the route designation (an input to 120, along with the packet) any indication of a packet destined to ports with violations.

In FIG. 1, the InputConfig[P] and OutputConfig[Q] buses (170,171) are binary bits indicating whether the violation is enabled for a particular port P or Q. There is separate configuration indication for each particular filter that is not explicitly indicated in the figure for simplicity.

In FIG. 2, InputConfig[P] (170) indicates the configuration information for the filters for port P and also receives a copy of the configuration information (271) for all ports.

It is also noted that the Infiniband protocol specifies other parameters, such as those relating to cyclic redundancy checks (CRC). However, these other parameters are unrelated to the structure or performance improvements provided by the present invention. Furthermore, Loopback and monitoring block 105 provides a diagnostic function that is optional in the Infiniband protocol and is mainly used for off-line test purposes. It is unrelated to the structure or operation of the present invention.

While the present invention is described above with particular reference to the Infiniband protocol, it is noted that the packet filtering circuits and methods provided herein are equally applicable to any similar data packet transmission protocol in which qualifying information is provided in a packet header or in a similar location.

While the present invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer readable medium having computer instructions executed by a computer to perform a method, wherein the method comprising the steps of:

determining, at an input port, the presence of an input port packet transmission protocol violation from packet header information for an information packet;

selecting said input port packet transmission protocol violation specific to said input port using at least one selector;

determining, only at said input port, the presence of an output port packet transmission protocol violation from the packet header information; and preventing transmission of said packet to a queue of packets for transmission to at least one output port due to said input port packet transmission protocol violation or to said output port packet transmission protocol violation.

2. The computer readable medium of claim 1 in which said transmission is prevented from reaching a plurality of output ports.

* * * * *